(No Model.)

W. L. BROWN.
POT AND KETTLE COVER.

No. 311,289. Patented Jan. 27, 1885.

WITNESSES:
John M. G. Deemer
C. Sedgwick

INVENTOR:
W. L. Brown
BY Munn & Co
ATTORNEYS.

UNITED STATES PATENT OFFICE.

WILLIS LAWTON BROWN, OF LAKE GENEVA, WISCONSIN.

POT AND KETTLE COVER.

SPECIFICATION forming part of Letters Patent No. 311,289, dated January 27, 1885.

Application filed July 21, 1884. (No model.)

*To all whom it may concern:*

Be it known that I, WILLIS LAWTON BROWN, of Lake Geneva, in the county of Walworth and State of Wisconsin, have invented a new and Improved Pot and Kettle Cover, of which the following is a full, clear, and exact description.

The object of my invention is to provide a simple, cheap, durable, and efficient cover for cooking or other vessels, and one which may readily be clamped upon or removed from the vessel, and will allow draining of boiling water from the vessel without danger of scalding the hands or spilling the solid contents of the vessel.

The invention consists in the construction and arrangement of parts, as will be hereinafter fully described and claimed.

Reference is to be had to the accompanying drawings, forming a part of this specification, in which similar letters of reference indicate corresponding parts in all the figures.

Figure 1:
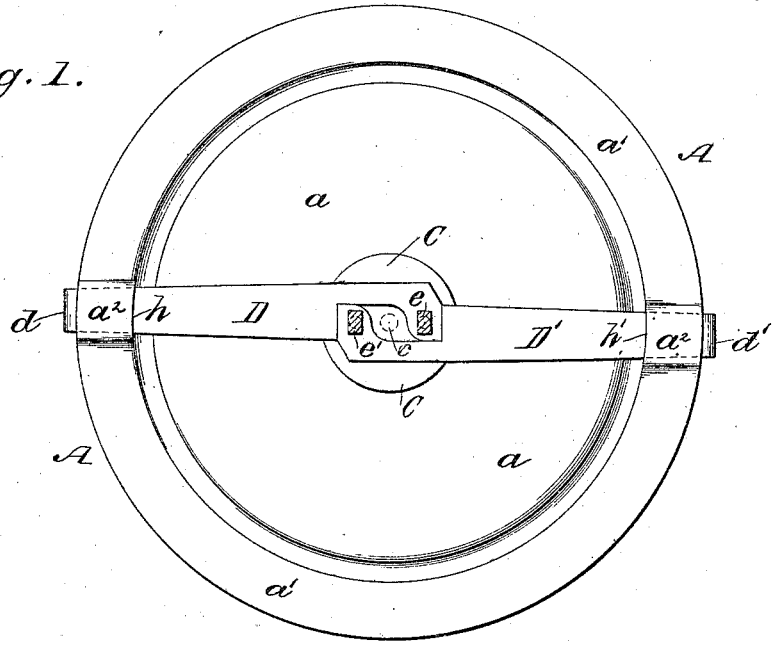
Figure 2:
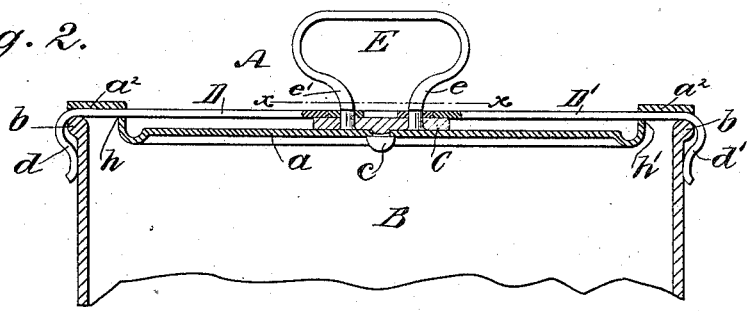
Figure 3:
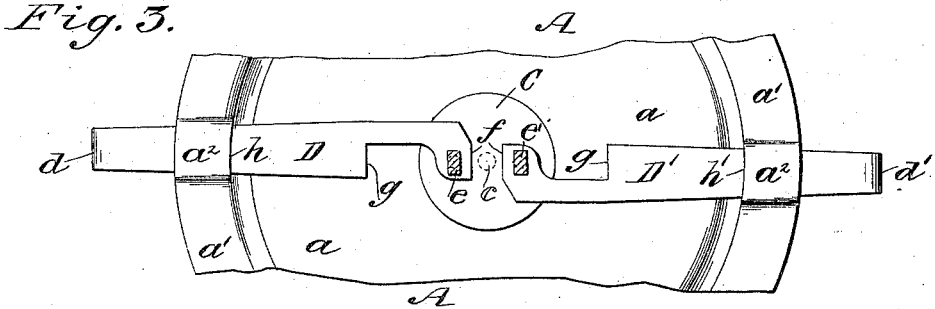

Figure 1 is a plan view of my improved cover, with the handle in section on line $x\ x$ in Fig. 2, and showing the opposite arms drawn inward as when clamping the cover to a pot or vessel. Fig. 2 is a central vertical sectional elevation with the cover clamped to the vessel, and Fig. 3 is a sectional plan view showing the locking-arms thrown outward so as to release the cover from the vessel.

The letter A indicates the improved cover, which I show with its inner or main central portion depressed or sunken, as at $a$, and so as to leave an outer flat rim portion, $a'$, to rest upon the top of a pot, kettle, or other vessel, B, for closing the vessel.

C is a plate which is pivoted to the center of the cover A by a rivet, $c$, and so as to be turned on the cover, and D D' are opposite or right and left hand arms, which in this instance are pivotally secured to the plate C by the arms or shanks $e\ e'$ of the handle E, said handle-arms being round where they enter the plate, so as to turn therein, and also being upset or riveted slightly at the inner side of the plate before the plate is pivoted to the cover. The arms D D' extend to either side of the cover, and have downwardly-bent end portions, $d\ d'$, which are curved, so as to clamp upon the outside of the vessel below its top or upper bead, $b$, when the inner ends of the arms are brought toward each other by turning the handle E so that the arms $e\ e'$ thereof shall lie respectively at the right and left hand of the center pivot, $c$, of the plate C, which plate turns with the handle, and when the arms D D' are in these positions the extreme ends $f$ of both the arms are carried against the shoulders $g$ of the opposite arms, which makes a secure lock to the arms for holding their clamping ends $d\ d'$ firmly to the sides of the vessel. By giving the handle E a half-turn to the left hand the plate C will be carried around that way by the handle, and the positions of the handle-arms $e\ e'$ will be reversed, as in Fig. 3, so as to separate the inner ends of the arms D D' and carry their ends $d\ d'$ outward from the vessel B, to allow the cover to be lifted therefrom, as will readily be understood. The central depression of the cover allows the arms D D' to lie straight flatwise; and to allow the arms—after they pass through the cover at $h\ h'$, respectively—to pass over the top edge of the vessel B without raising the cover from said top, I press the metal of the rim $a'$ of the cover upward, as at $a^2$, for about the width and thickness of the arms, so that the arms shall lie flat in shallow pockets of the rim so formed, and the under sides of the arms be in the same plane as the under side or face of the rim, to allow the cover to close tightly upon the top of the vessel all around. It will thus be seen that by a half-turn of the handle the cover A may be locked to or released from the vessel.

In practice I may make the arms D D' of spring metal, so that their ends $d\ d'$ shall clamp upon vessels of various sizes, allowing the one cover to be used for several vessels.

My improved cover is especially useful when applied to cooking-vessels in which substances have been boiled and from which the boiling water is to be drained off, as the handle E will of itself hold the cover on while the vessel is tipped sidewise to pour off the water; or the handle may be held on by one hand and the vessel tipped with the other, and without danger of scalding the hands by an excessive rush of steam from the vessel or of the escape of the solid contents of the vessel. The covers may of course be made in various sizes and of any suitable material or materials, sheet metal being preferred for the main body portion of the cover and the locking-arms D D', while the handle E and plate C may be made of malleable iron, thus making a light, cheap, and durable article.

Having thus described my invention, what I claim as new, and desire to secure by Letters Patent, is—

1. The combination, with a cover, of the plate C, pivoted to the center thereof, and provided with a handle, and the clamping-arms D, pivoted at their inner ends to the plate C, and bent downward at their outer ends, substantially as set forth.

2. The cover A, formed with a central depression, an outer flat portion, $a'$, above the plane of said depressed portion, and raised pockets $a^2$, the under surfaces of which are in a higher plane than the under surface of said portion $a'$, in combination with the revoluble plate C and the clamping-arms D D', pivoted to said plate, and passing through the pockets $a^2$, the under sides of said clamping-arms being flush with the under surface of the raised part $a'$, thereby allowing said raised part to rest evenly on the rim of a vessel, substantially as set forth.

3. The combination, with the cover A, of the plate C, pivoted thereto, and provided with a handle, E, having shanks $e\ e'$, and the clamping-arms D D', pivoted to said plate C by the shanks $e\ e'$, said shanks serving to hold the handle to the pivoted plate and as pivots to the clamping-arms, substantially as set forth.

4. The combination, with the cover A, the plate C, pivoted thereto, and the handle E, having shanks $e\ e'$, riveted to the plate C, of the clamping-arms D D', pivoted at their ends $f$ to opposite sides of the plate C by the shanks $e\ e'$, and formed with recesses on their opposite edges, near their inner ends, to form shoulders $g$, substantially as set forth.

WILLIS LAWTON BROWN.

Witnesses:
D. W. RUNKLE,
WARREN BECKWITH.